US008924240B2

(12) United States Patent
Depura et al.

(10) Patent No.: US 8,924,240 B2
(45) Date of Patent: Dec. 30, 2014

(54) SYSTEM FOR MONITORING VEHICLE AND OPERATOR BEHAVIOR

(76) Inventors: Shailendra Depura, Columbus, OH (US); Bhavna Shailendra Depura, Columbus, OH (US); Jamna Lal Depura, West Bengal (IN); Kanta Depura, West Bengal (IN); Shalini Memani, Maharastra (IN)

( * ) Notice: Subject to any disclaimer, the term of this patent is extended or adjusted under 35 U.S.C. 154(b) by 110 days.

(21) Appl. No.: 13/477,475

(22) Filed: May 22, 2012

(65) Prior Publication Data

US 2012/0303392 A1 Nov. 29, 2012

Related U.S. Application Data

(60) Provisional application No. 61/519,550, filed on May 25, 2011.

(51) Int. Cl.
  *G06Q 40/00* (2012.01)
(52) U.S. Cl.
  USPC ............... 705/4; 701/469; 701/472; 701/538
(58) Field of Classification Search
  USPC ............................. 705/4; 701/469, 472, 538
  See application file for complete search history.

(56) References Cited

U.S. PATENT DOCUMENTS

| | | | |
|---|---|---|---|
| 6,931,309 B2 | 8/2005 | Phelan et al. | |
| 6,957,133 B1 | 10/2005 | Hunt et al. | |
| 8,090,598 B2 | 1/2012 | Bauer et al. | |
| 8,117,049 B2 | 2/2012 | Berkobin et al. | |
| 8,140,358 B1 | 3/2012 | Ling et al. | |
| 2005/0096809 A1 | 5/2005 | Skeen et al. | |
| 2005/0137757 A1 | 6/2005 | Phelan et al. | |
| 2006/0253307 A1 | 11/2006 | Warren et al. | |
| 2007/0027726 A1 | 2/2007 | Warren et al. | |
| 2008/0048886 A1* | 2/2008 | Brown et al. | 340/937 |
| 2008/0255722 A1* | 10/2008 | McClellan et al. | 701/35 |
| 2009/0024273 A1* | 1/2009 | Follmer et al. | 701/35 |
| 2009/0024419 A1 | 1/2009 | McClellan et al. | |
| 2011/0153367 A1* | 6/2011 | Amigo et al. | 705/4 |
| 2012/0135382 A1* | 5/2012 | Winston et al. | 434/65 |
| 2013/0046559 A1* | 2/2013 | Coleman et al. | 705/4 |

OTHER PUBLICATIONS

Benjamin, M. T. (1997). Feasibility of the global positioning system (GPS) for the collection of motor vehicles dynamics and activity data. (Order No. 9721336, University of California, Los Angeles). ProQuest Dissertations and Theses, 202-202 p. Retrieved from http://search.proquest.com/docview/304351738?accountid=14753. (304351738).*

(Continued)

*Primary Examiner* — Muriel Tinkler
(74) *Attorney, Agent, or Firm* — McNees Wallace & Nurick, LLC

(57) ABSTRACT

A system for monitoring operator and motor vehicle behavior, including at least one mobile device; application software resident on the mobile device, wherein the application software is operative to gather and record information relevant to both the behavior of a motor vehicle and the behavior of an operator of the motor vehicle, and wherein the application software is activated or deactivated based on certain predetermined trigger events; and at least one information processor in communication with and/or resident on the mobile device, wherein the information processor is operative to process and characterize the information gathered by the application software and communicate the processed and characterized information to a user of the system.

20 Claims, 18 Drawing Sheets

(56) References Cited

OTHER PUBLICATIONS

Jackson, E. D. (2008). Improving traffic simulation models and emissions models using on-board vehicle dynamics data. (Order No. 3308235, University of Connecticut). ProQuest Dissertations and Theses, , 202. Retrieved from http://search.proquest.com/docview/304642404?accountid=14753. (304642404).*

* cited by examiner

| NAME OF THE SUB-SYSTEM | START TRIGGERS | STOP TRIGGERS | OTHER TRIGGERS |
|---|---|---|---|
| ADMINISTRATIVE CONTROL SUB-SYSTEM | SET-UP COMPLETE<br>LICENSE RENEWED<br>FORCE START | END OF LICENSE TERM<br>LOCAL DATABASE SIZE<br>BATTERY CHARGE<br>FORCE STOP | SET-UP INCOMPLETE |
| DATA COLLECTION SUB-SYSTEM | CHANGE IN LOCATION<br>SPEED<br>TIME<br>FORCE START | SPEED<br>TIME<br>ALTITUDE<br>FORCE STOP | |
| DATA TRANSMISSION SUB-SYSTEM | PRESENCE OF DATA IN LOCAL DATABASE<br>FILE SIZE<br>TIME<br>FORCE START | TIME<br>NUMBER OF ATTEMPTS<br>FORCE STOP | |

FIG. 6

| Customer Number | Date | Time | Speed | Speed Limit | Zip code | Direction | Use of Cell Phone | Latitude | Longitude |
|---|---|---|---|---|---|---|---|---|---|
| ABC123456789DM | 8/2/2011 | 18:41:01 | 28.1 | 25.0 | 43016 | 280.0 | Idle | 40.110 | -83.160 |
| ABC123456789DM | 8/2/2011 | 18:41:03 | 29.6 | 25.0 | 43016 | 279.1 | Idle | 40.110 | -83.161 |
| ABC123456789DM | 8/2/2011 | 18:41:04 | 30.8 | 25.0 | 43016 | 279.6 | Idle | 40.110 | -83.161 |
| ABC123456789DM | 8/2/2011 | 18:41:34 | 30.4 | 25.0 | 43016 | 341.5 | Idle | 40.113 | -83.163 |
| ABC123456789DM | 8/2/2011 | 18:42:25 | 29.3 | 25.0 | 43016 | 40.6 | Idle | 40.119 | -83.164 |
| ABC123456789DM | 8/2/2011 | 18:43:10 | 22.6 | 25.0 | 43016 | 264.2 | Idle | 40.122 | -83.164 |
| ABC123456789DM | 8/2/2011 | 18:43:21 | 14.6 | 25.0 | 43016 | 8.2 | Idle | 40.123 | -83.164 |
| ABC123456789DM | 8/2/2011 | 18:43:22 | 17.1 | 25.0 | 43016 | 11.0 | Idle | 40.123 | -83.164 |
| ABC123456789DM | 8/2/2011 | 18:43:24 | 19.4 | 25.0 | 43016 | 5.7 | Idle | 40.123 | -83.164 |
| ABC123456789DM | 8/2/2011 | 18:43:27 | 22.3 | 25.0 | 43016 | 355.3 | Idle | 40.123 | -83.164 |
| ABC123456789DM | 8/2/2011 | 18:43:37 | 27.0 | 25.0 | 43016 | 316.6 | Idle | 40.124 | -83.165 |
| ABC123456789DM | 8/2/2011 | 18:43:42 | 27.0 | 25.0 | 43016 | 316.6 | Telephone Call | 40.124 | -83.165 |
| ABC123456789DM | 8/2/2011 | 18:44:12 | 22.8 | 25.0 | 43016 | 352.8 | Telephone Call | 40.106 | -83.160 |
| ABC123456789DM | 8/2/2011 | 18:45:03 | 19.2 | 25.0 | 43016 | 337.4 | Telephone Call | 40.107 | -83.160 |
| ABC123456789DM | 8/2/2011 | 18:45:08 | 20.9 | 25.0 | 43016 | 335.2 | Telephone Call | 40.107 | -83.160 |
| ABC123456789DM | 8/2/2011 | 18:45:13 | 22.1 | 25.0 | 43016 | 360.0 | Telephone Call | 40.107 | -83.160 |
| ABC123456789DM | 8/2/2011 | 18:45:18 | 23.4 | 25.0 | 43016 | 344.3 | Telephone Call | 40.107 | -83.160 |
| ABC123456789DM | 8/2/2011 | 18:45:23 | 27.0 | 25.0 | 43016 | 351.5 | Telephone Call | 40.107 | -83.160 |
| ABC123456789DM | 8/2/2011 | 18:45:29 | 29.0 | 25.0 | 43016 | 353.0 | Telephone Call | 40.107 | -83.160 |
| ABC123456789DM | 8/2/2011 | 18:45:34 | 30.3 | 25.0 | 43016 | 354.6 | Telephone Call | 40.108 | -83.160 |
| ABC123456789DM | 8/2/2011 | 18:45:44 | 32.1 | 25.0 | 43016 | 355.0 | Telephone Call | 40.108 | -83.160 |
| ABC123456789DM | 8/2/2011 | 18:45:49 | 36.1 | 25.0 | 43016 | 359.5 | Telephone Call | 40.108 | -83.160 |
| ABC123456789DM | 8/2/2011 | 18:45:59 | 39.1 | 25.0 | 43016 | 6.5 | Telephone Call | 40.108 | -83.160 |
| ABC123456789DM | 8/2/2011 | 18:47:10 | 17.0 | 25.0 | 43016 | 303.3 | Telephone Call | 40.110 | -83.160 |
| ABC123456789DM | 8/2/2011 | 18:47:16 | 18.8 | 25.0 | 43016 | 306.5 | Telephone Call | 40.110 | -83.160 |
| ABC123456789DM | 8/2/2011 | 18:47:21 | 20.1 | 25.0 | 43016 | 307.6 | Telephone Call | 40.110 | -83.160 |
| ABC123456789DM | 8/2/2011 | 18:47:26 | 21.4 | 25.0 | 43016 | 301.6 | Telephone Call | 40.110 | -83.160 |
| ABC123456789DM | 8/2/2011 | 18:47:31 | 22.8 | 25.0 | 43016 | 295.6 | Telephone Call | 40.110 | -83.160 |
| ABC123456789DM | 8/2/2011 | 18:47:36 | 24.6 | 25.0 | 43016 | 290.3 | Telephone Call | 40.110 | -83.160 |
| ABC123456789DM | 8/2/2011 | 18:47:46 | 26.0 | 25.0 | 43016 | 284.1 | Telephone Call | 40.110 | -83.160 |
| ABC123456789DM | 8/2/2011 | 18:47:52 | 28.1 | 25.0 | 43016 | 280.0 | Telephone Call | 40.110 | -83.160 |
| ABC123456789DM | 8/2/2011 | 18:48:02 | 29.6 | 25.0 | 43016 | 279.1 | Idle | 40.110 | -83.161 |
| ABC123456789DM | 8/2/2011 | 18:48:02 | 30.8 | 25.0 | 43016 | 279.6 | Idle | 40.110 | -83.161 |

FIG. 8

|  | Your driving performance | Average driver |
|---|---|---|
| CELL PHONE USAGE | | |
| Time (minutes) | 200 | 350 |
| Distance (miles) | 50 | 100 |

| GEOGRAPHY (your performance) | | |
|---|---|---|
| | Time spent (minutes) | Distance travelled (miles) |
| Top 3 zip codes | | |
| 43228 | 900 | 400 |
| 43215 | 500 | 200 |
| 43223 | 200 | 100 |

FIG. 11E

| REPORT PERIOD | |
|---|---|
| Start date | May 1 2011 |
| End date | May 31 2011 |
| CUSTOMER NUMBER | ABC123456789DM |

|  | Your driving performance | Average driver |
|---|---|---|
| DRIVING PERFORMANCE | | |
| Total distance (miles) | 6,000 | 6,500 |
| Travel time (hours) | 120 | 110 |
| Average Speed (miles per hour) | 50 | 59 |
| CAPACITY UTILIZATION | | |
| Available time (hours) | 160 | 160 |
| Driving time vs. available time (%) | 75% | 69% |

FIG. 11F

SYSTEM FOR MONITORING VEHICLE AND OPERATOR BEHAVIOR

CROSS-REFERENCE TO RELATED APPLICATIONS

This patent application claims the benefit of U.S. Provisional Patent Application Ser. No. 61/519,550 filed on May 25, 2011, and entitled "System and Process to Monitor and Classify the Behavior of an Operator when Operating a Motor Vehicle and Behavior of Motor Vehicle Being Operated," the disclosure of which is hereby incorporated by reference herein in its entirety and made part of the present U.S. utility patent application for all purposes.

BACKGROUND OF THE INVENTION

The described invention relates in general to systems and methods for monitoring both the behavior of a vehicle and the behavior of an individual operating the vehicle, and more specifically to a system for monitoring and recording the behavior of a vehicle and the behavior of the individual operating the vehicle using a mobile device such as a cell phone, smartphone, or the like.

Conventional methods of monitoring the behavior of an operator, when operating a motor vehicle, typically require installation of one or more monitoring devices in the vehicle. Such devices may include an onboard computer and multiple sensors that collect vehicle operation data such as, for example, speed, location, and time of day or data readers that plug directly into an on-board diagnostic port. As such, these monitoring systems are not designed to be portable and cannot be easily transferred from one vehicle to another. Furthermore, incorrect installation may interfere with the normal and safe operation of the vehicle. Additionally, these monitoring systems may limit the monitoring and recording of data to the operation/function of the motor vehicle itself and may not monitor and record information regarding the operator's own behavior (such as texting or phone usage), which may cause distraction and diminish the ability of the operator to safely operate the motor vehicle. Therefore, there is an ongoing need for a system for monitoring vehicles and the operators of those vehicles that is portable, does not require installation in the vehicle, and that records information regarding both the behavior and functions of the vehicle and the behavior of the person driving or otherwise operating the vehicle.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a system for monitoring operator and motor vehicle behavior is provided. This system includes at least one mobile device; application software available to or resident on the mobile device, wherein the application software is operative to gather and record information relevant to both the behavior of a motor vehicle and the behavior of an operator of the motor vehicle, and wherein the application software is activated or deactivated based on certain predetermined trigger events; and at least one information processor in communication with and/or resident the mobile device, wherein the information processor is operative to process and characterize the information gathered by the application software and communicate the processed and characterized information to a user of the system in one or more formats.

In accordance with another aspect of the present invention, an alternate system for monitoring operator and motor vehicle behavior is provided. This system includes at least one mobile device, wherein the mobile device is located within a motor vehicle being operated by an operator of the vehicle; first application software available to or resident on the mobile device, wherein the first application software is operative to measure or determine information relevant to both the behavior of the motor vehicle and the behavior of the operator of the motor vehicle; second application software resident on the mobile device, wherein the second application software is operative to gather and record information generated by the first application software, and wherein the second application software is activated or deactivated based on certain predetermined trigger events; and at least one information processor in communication with and/or resident on the mobile device, wherein the information processor is operative to process and characterize the information gathered by the second application software and communicate the processed and characterized information to a user of the system in one or more formats.

In yet another aspect of this invention, an alternate system for monitoring operator and motor vehicle behavior is provided. This system includes a motor vehicle; an operator, wherein the operator is operating the motor vehicle; at least one mobile device, wherein the mobile device is located within the motor vehicle being operated; first application software available to or resident on the mobile device, wherein the first application software is operative to measure or determine information relevant to both the behavior of the motor vehicle and the behavior of the operator of the motor vehicle; second application software resident on the mobile device, wherein the second application software is operative to gather and record information generated by the first application software, and wherein the second application software is activated or deactivated based on certain predetermined trigger events; and at least one information processor in communication with and/or resident on the mobile device, wherein the information processor is operative to process and characterize the information gathered by the second application software and communicate the processed and characterized information to a user of the system in one or more formats.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein:

FIG. 6 is a table presenting examples of various trigger events used in the operation of the vehicle and operator monitoring system of the present invention;

FIG. 8 depicts a sample data transmission file in accordance with the vehicle and operator monitoring system of the present invention;

FIG. 11E is a fifth example of a usage summary report in accordance with the vehicle and operator monitoring system of the present invention;

FIG. 11F is a sixth example of a usage summary report in accordance with the vehicle and operator monitoring system of the present invention.

DETAILED DESCRIPTION OF THE INVENTION

Figure 1A:
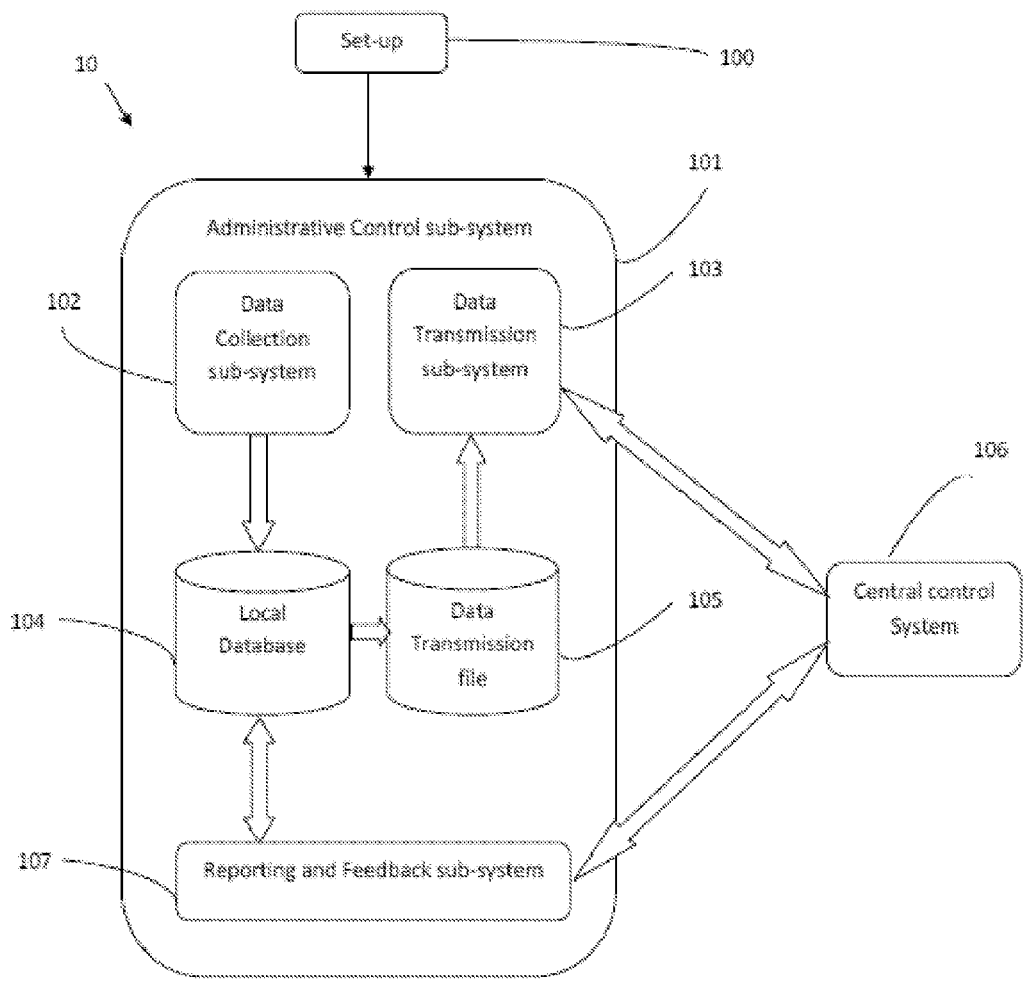
FIG. 1A is a block diagram of an exemplary embodiment of the vehicle and operator monitoring system of the present invention illustrating the components and subsystems thereof.

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to a system for monitoring both the behavior of a motor vehicle and the behavior of the operator of that motor vehicle (while the vehicle is being driven or otherwise operated). Relevant data is collected using a mobile telephone, smart phone or other portable device and transmitted to a remote server where the data is further processed, characterized, and reported back to the operator and/or to another end-user of the system. One or more algorithms included in this invention may be used, developed, or updated to analyze data gathered by the system and assign a comparative risk rating (or other characterization) to the operator of a vehicle. Data recorded and/or derived from data gathered by this invention may be used for other purposes such as, for example, determining the cost of vehicle insurance, dispatching emergency services, commercial vehicle and fleet management, route optimization, education, law enforcement, monitoring and supervising young drivers, and marketing location-based products and services. The present invention gathers useful data from existing mobile devices such as smart phones and does not require hard-wiring a device into a vehicle or other installation procedures, the incorrect execution of which may affect vehicle function or distract the vehicle's operator. Application software resident on the mobile device component of this invention may also be used to independently verify the time using a variety of external sources including the central processing system, one or more atomic clocks, cellular service providers, or by other means. With reference now to the Figures, one or more specific embodiments of this invention shall be described in greater detail.

The block diagram provided in FIG. 1A illustrates the components and subsystems of an exemplary embodiment of the present invention. Set-up subsystem 100 is used by the operator of a motor vehicle to configure monitoring system 10. Once monitoring system 10 is initially configured using set-up subsystem 100, monitoring system 10 then operates within the guidance and control of administrative subsystem 101. Administrative subsystem 101 guides and controls the operations of data collection subsystem 102, data transmission subsystem 103, local database 104, data transmission file 105 and reporting and feedback subsystem 107. Data transmission subsystem 103 uses data transmission file 105 to communicate with central control system 106. Reporting and feedback subsystem 107 may provide reports and feedback to a user of monitoring system 10 either from local database 104 or from central control system 106, or from a combination of both. FIG. 6 is a table presenting examples of various trigger events used by the subsystems of monitoring system 10.

These trigger events may be used to start a subsystem, stop a subsystem or modify the behavior of a subsystem.

Figure 1B:
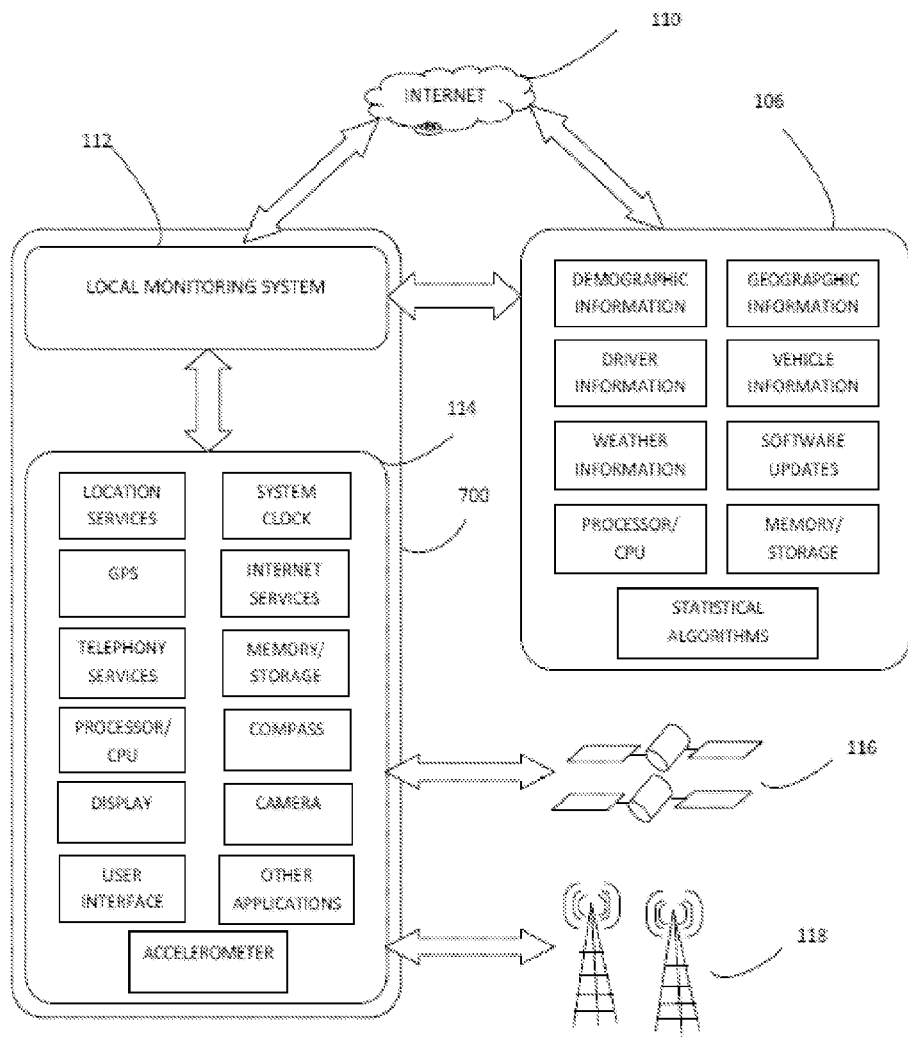
FIG. 1B is a block diagram of an exemplary embodiment of the vehicle and operator monitoring system of the present invention illustrating the components of the system that are resident on the handheld device, the components that are resident on the central control system and the means by which these components communicate internally and externally.
Figure 1C:
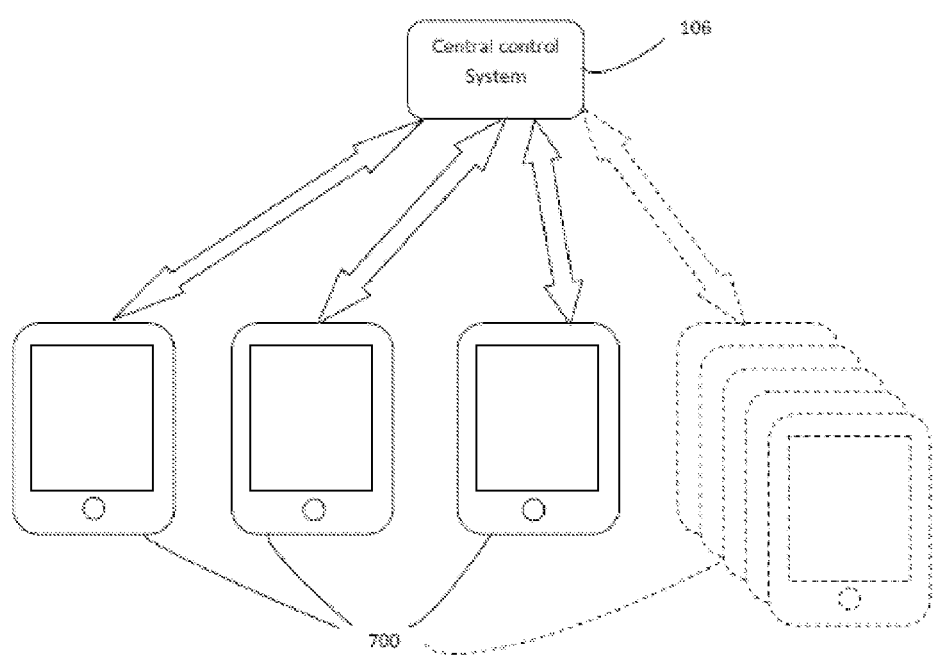
FIG. 1C is a block diagram illustrating that the central control system of the present invention may be in simultaneous communication with a plurality of handheld devices.

The block diagram provided in FIG. 1B illustrates the components of system 10 that are resident on handheld device 700, the components that are resident on central control system 106 and the means by which these components communicate internally and externally. Local monitoring system 112 receives, processes, and stores information from a variety of local application software, system components, and/or local hardware available to the mobile device including those shown in FIG. 1B (or other components). Handheld device 700 may also communicate with one or more satellites 116 and/or mobile network 118. Central control system 106 typically includes the components shown in FIG. 1B (or other components) and communicates with handheld device 700 by a variety of communication means including one or more cellular networks, Bluetooth, infrared, and/or internet connection 110. FIG. 1C is a block diagram illustrating that the central control system of the present invention may be in simultaneous communication with a plurality of handheld devices.

Figure 2:
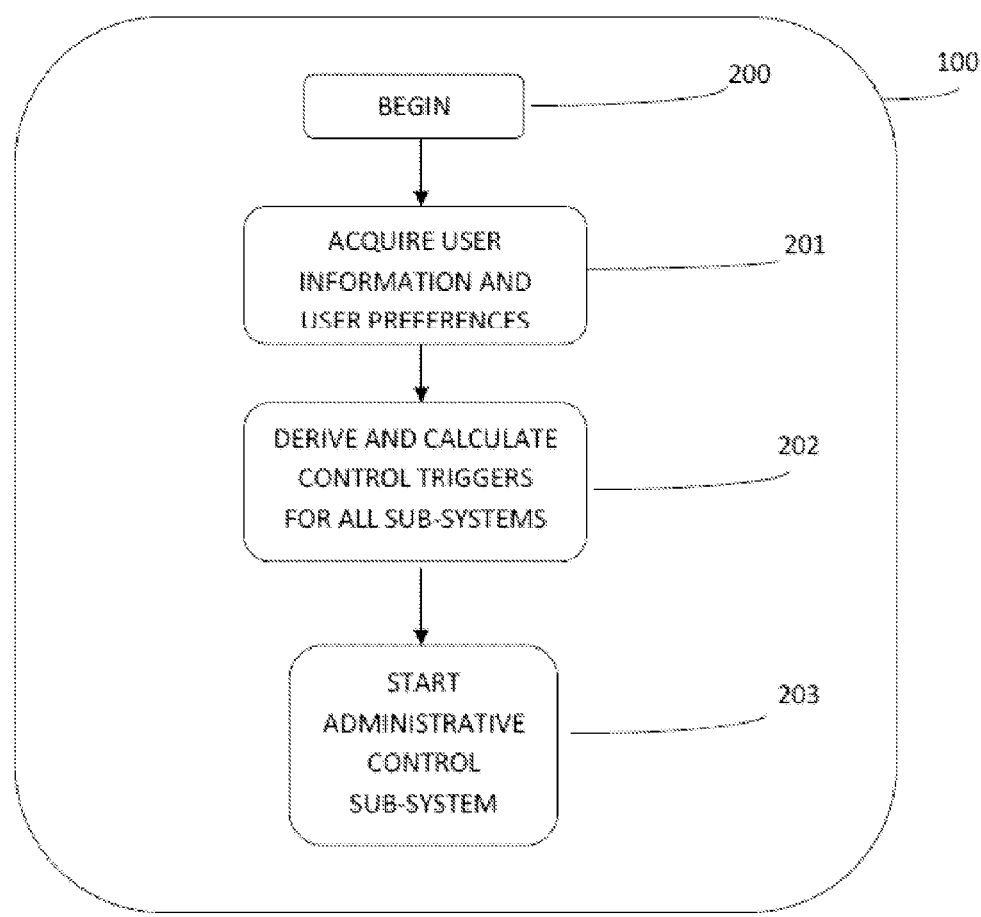
FIG. 2 is a flow chart illustrating the operation of the set-up subsystem of the vehicle and operator monitoring system of FIG. 1.

The flow chart provided in FIG. 2 illustrates the operation of set-up subsystem 100. Set-up subsystem 100 is initiated at step 200 when a user first starts using monitoring system 10 and each time the user wishes to re-configure monitoring system 10 thereafter. At step 201, set-up subsystem 100 acquires information such as, for example, confirmation of software license for use of system 10; date of license grant (initial or renewed); vehicle identification number; make, model and year of the vehicle. Set-up subsystem 100 also acquires user preferences at step 201, which may include auto/manual updates to system software, real-time versus batch data transmission, data transmission preferences, data sharing, display reports, colors and themes, among others. At step 202, set-up subsystem 100 derives and calculates a plurality of control triggers for all of the subsystems of monitoring system 10. At step 203, set-up subsystem 100 initiates administrative control subsystem 203.

Figure 3A:
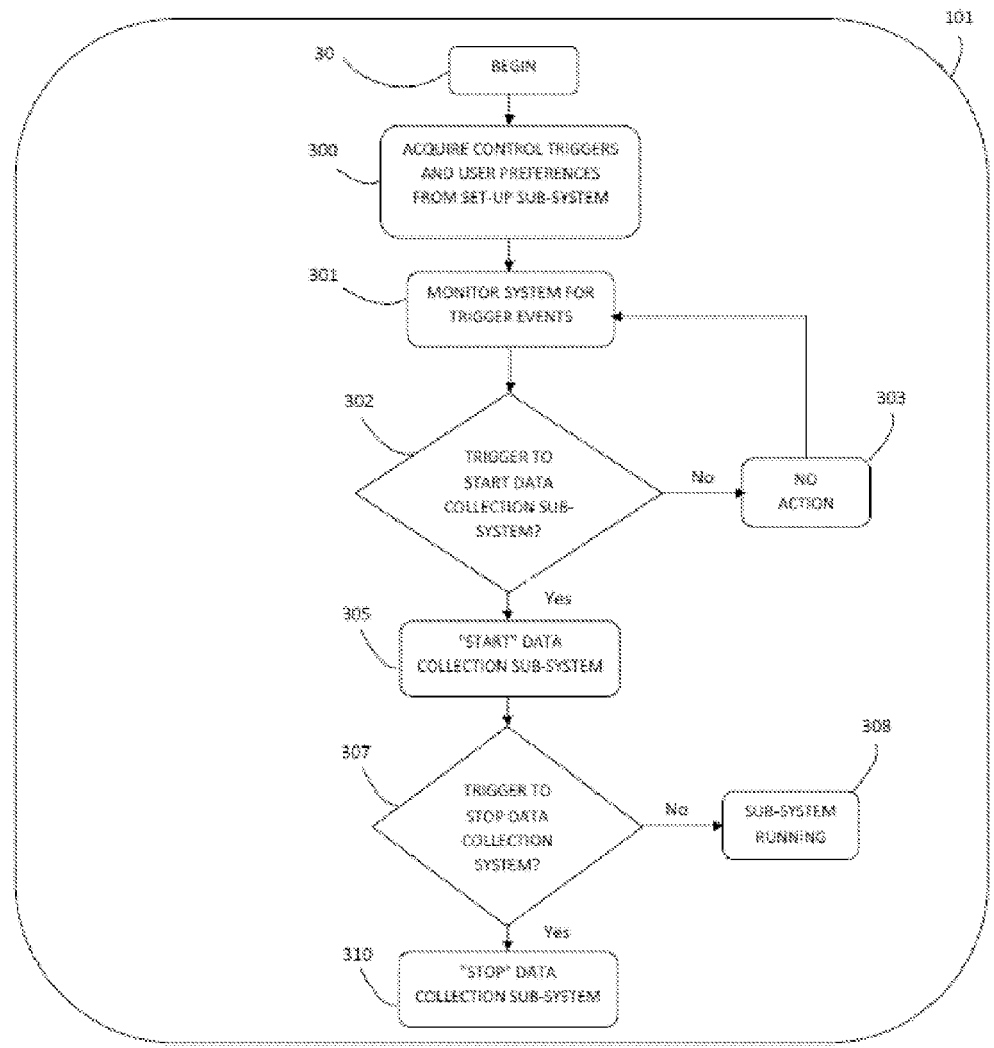
FIG. 3A is a flow chart illustrating the operation of the administrative control subsystem of the vehicle and operator monitoring system of FIG. 1 with regard to data collection.
Figure 3B:
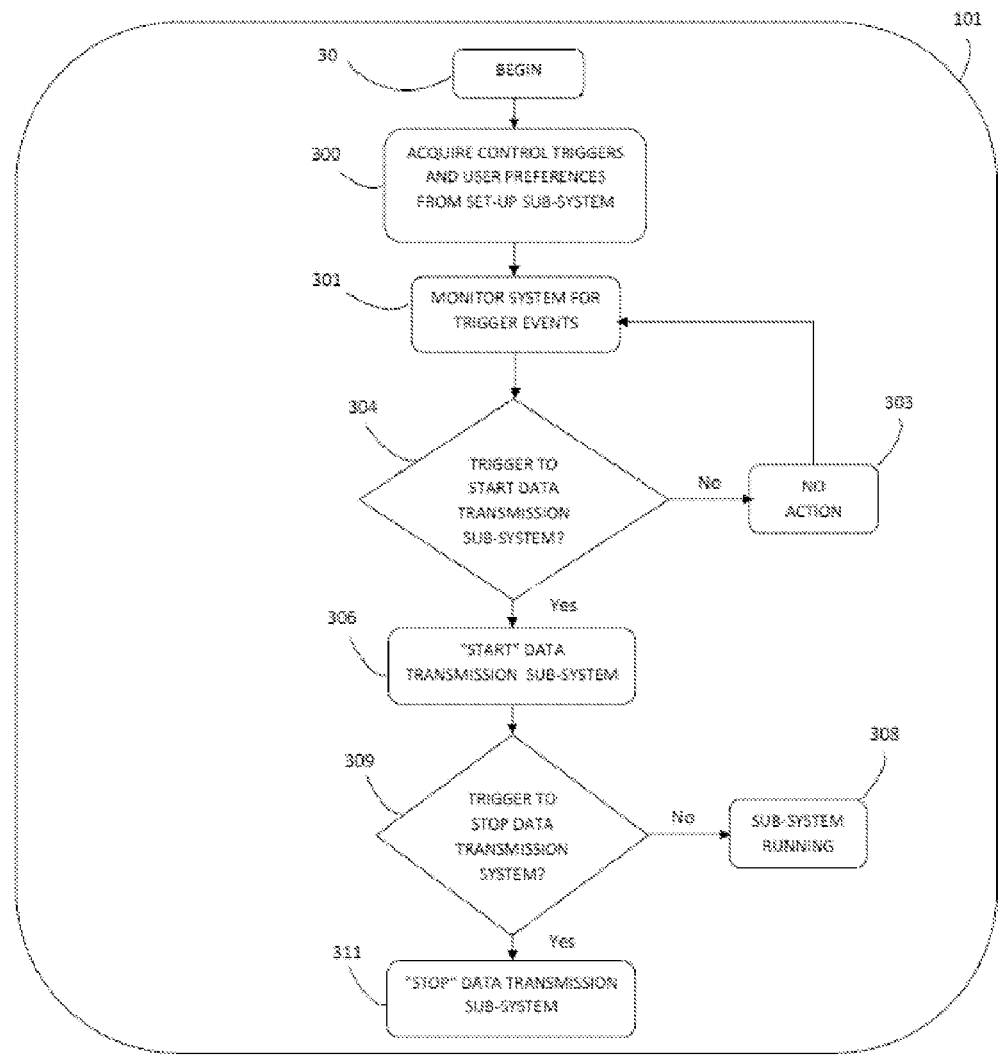
FIG. 3B is a flow chart illustrating the operation of the administrative control subsystem of the vehicle and operator monitoring system of FIG. 1 with regard to data transfer.
Figure 3C:
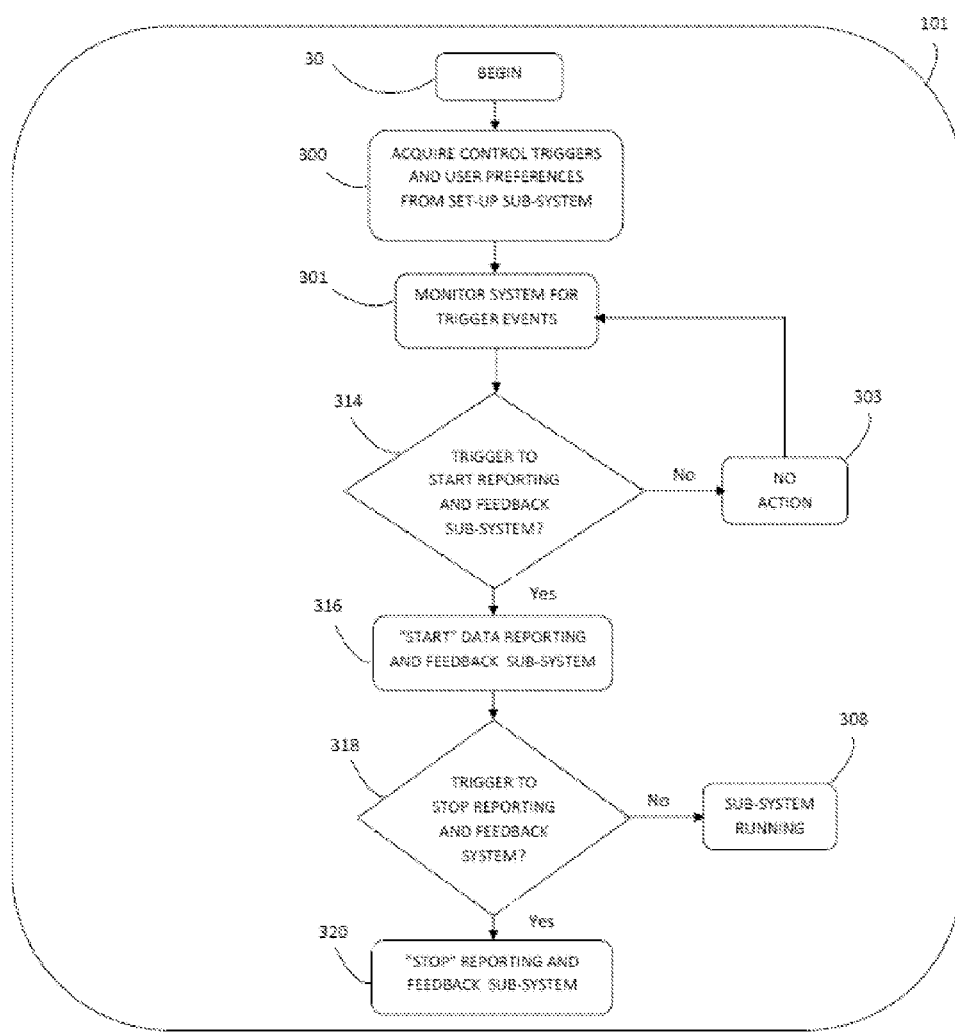
FIG. 3C is a flow chart illustrating the operation of the administrative control subsystem of the vehicle and operator monitoring system of FIG. 1 with regard to reporting and feedback.

The flow charts provided in FIGS. 3A-C illustrate the functionality and operation of administration control subsystem 101, which controls the operations of all the other subsystems in monitoring system 10. Administrative control subsystem 101 monitors system 10 for a plurality of trigger events to start, stop or modify the behavior of the other subsystems. In FIG. 3A, administrative control subsystem 101 controls the operation of data collection subsystem 102 by beginning at step 30, acquiring control triggers and user preferences from set-up subsystem 100 at step 300 and monitoring system 10 for trigger events at step 301. Decision step 302 is based on the presence of a trigger, or the lack thereof, to initiate data collection subsystem 102. Lack of a trigger results in no action at step 303, while the presence of a "start" trigger initiates data collection subsystem 102 at step 305. Decision step 307 is based on the presence of a trigger, or the lack thereof, to terminate data collection subsystem 102. Lack of a trigger results in continued running of data collection subsystem 102 at step 308, while the presence of a "stop" trigger terminates data collection subsystem 102 at step 310. In FIG. 3B, administrative control subsystem 101 controls the operation of data transmission subsystem 103 by beginning at step 30, acquiring control triggers and user preferences from set-up subsystem 100 at step 300 and monitoring system 10 for trigger events at step 301. Decision step 304 is based on the presence of a trigger, or the lack thereof, to initiate data transmission subsystem 103. Lack of a trigger results in no action at step 303, while the presence of a "start" trigger initiates data collection subsystem 103 at step 306. Decision step 309 is based on the presence of a trigger, or the lack thereof, to terminate data transmission subsystem 103. Lack of a trigger results in continued running of data transmission subsystem 103 at step 308, while the presence of a "stop" trigger terminates data transmission subsystem 103 at step 311. In FIG. 3C, administrative control subsystem 101 controls the operation of reporting and feedback subsystem 107 by beginning at step 30, acquiring control triggers and user preferences from set-up subsystem 100 at step 300 and monitoring system 10 for trigger events at step 301. Decision step 314 is based on the presence of a trigger, or the lack thereof, to initiate data reporting and feedback subsystem 107. Lack of a trigger results in no action at step 303, while the presence of a "start" trigger initiates data reporting and feedback subsystem 107 at step 316. Decision step 318 is based on the presence of a trigger, or the lack thereof, to terminate data reporting and feedback subsystem 107. Lack of a trigger results in continued running of data reporting and feedback subsystem 107 at step 308, while the presence of a "stop" trigger terminates data reporting and feedback subsystem 107 at step 320. An example of a trigger event would be the expiration of a license agreement for the use of monitoring system 10. Administrative control subsystem 101 would use this "stop" trigger to stop all other subsystems. Another example of a trigger event would be restarting of the cellular phone or smartphone. The administrative control subsystem 101 would use this "start" trigger to start all subsystems.

Figure 4:
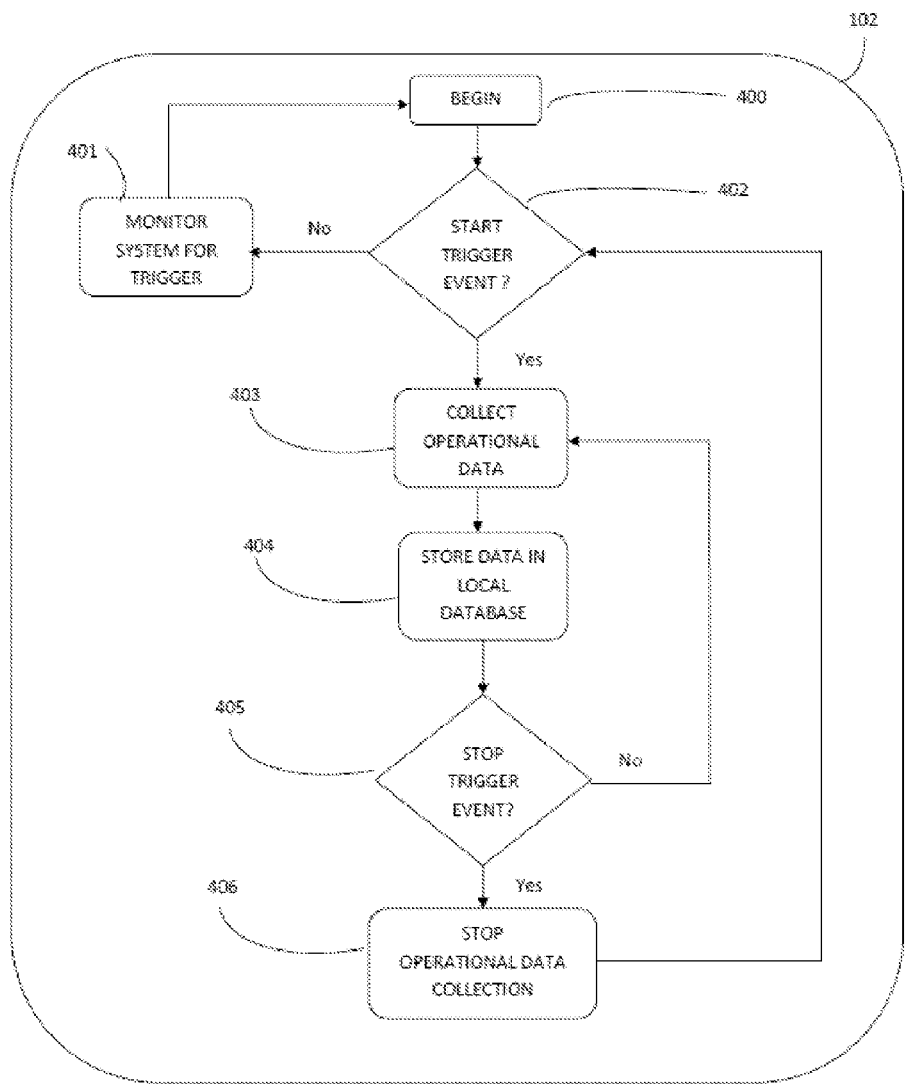
FIG. 4 is a flow chart illustrating the operation of the data collection subsystem of the vehicle and operator monitoring system of FIG. 1.

The flow chart provided in FIG. 4 illustrates the operation of data collection subsystem 102, which collects data based on predetermined trigger events. Operation of data collection subsystem 102 begins at step 400 and proceeds to decision step 402. If no "start" trigger event has occurred, data collection subsystem 102 continues to monitor system 10 for trigger events at step 401. If a "start" trigger event has occurred at decision step 402, data collection subsystem 102 begins to collect operational data at step 403. This data is then stored in local database 104, which typically resides on a mobile phone or similar device, at step 404. This cycle will continue until a "stop" trigger event occurs at step 405 at which point data collection subsystem 102 will cease collecting operational data and/or other data. An example of a trigger event would be the motion sensor in the cellular phone detecting a predetermined speed. Data collection subsystem 102 would use this "start" trigger to begin collecting operational data. Another example of a trigger event would be a system alarm or predetermined time intervals. Data collection subsystem 102 would use this "start" trigger to start collecting operational data. Data collection subsystem 102 is typically operative to monitor and record certain data such as, for example, date; time; current geographic location; speed of motion; speed limit; direction of motion; and use of cellular phone by the operator. These data may then be used to calculate and derive or determine other relevant factors such as, for example, rapid acceleration; rapid deceleration; change in direction; speed of change in direction; distance travelled; and total travel time. Data collection subsystem 102 typically utilizes multiple sensors and services (e.g. one or more internal sensors and various application software) resident on or available to (i.e., external to) the mobile device such as, for example, a compass; an accelerometer; a global positioning system (GPS); an atomic clock; temperature and weather monitoring; cell phone tower triangulation; and internet access and connectivity.

Figure 5:
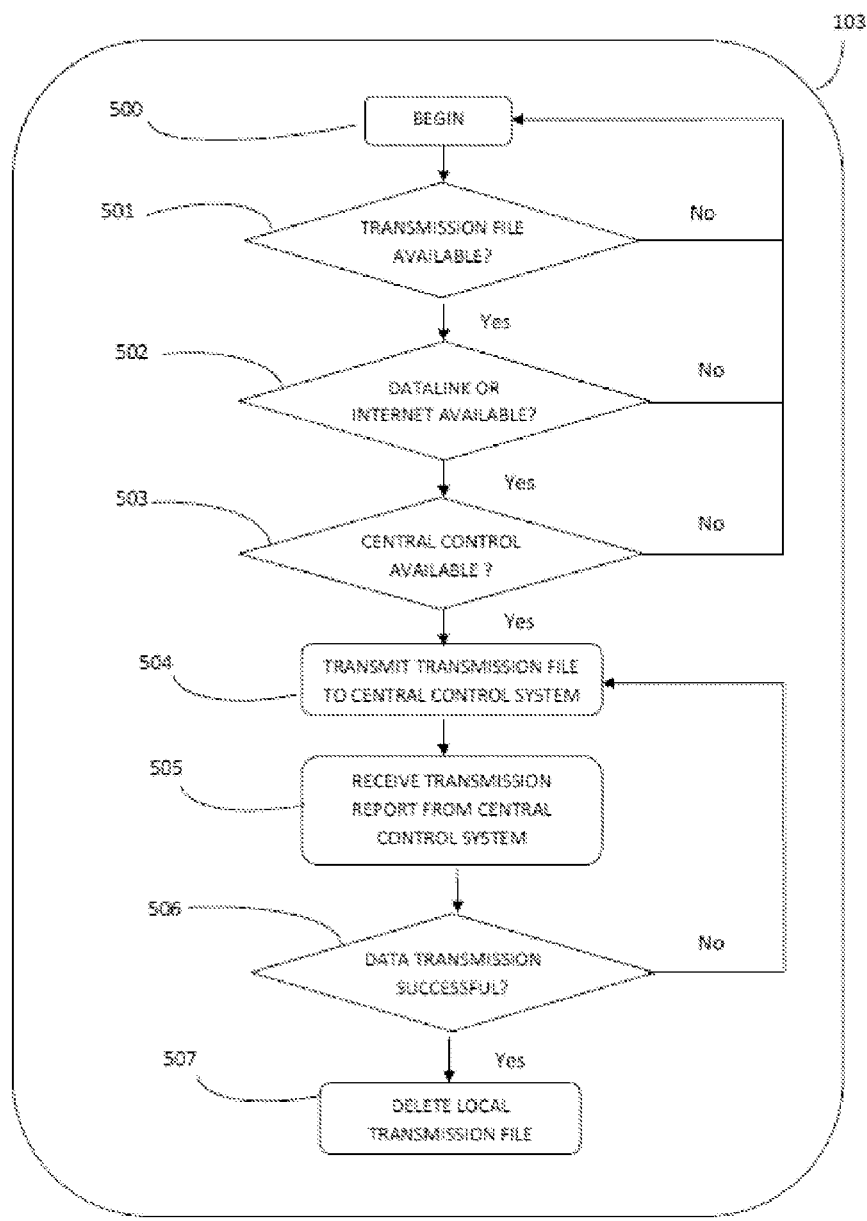
FIG. 5 is a flow chart illustrating the operation of the data transmission subsystem of the vehicle and operator monitoring system of FIG. 1.

FIG. 5 is a flow chart illustrating the operation of data transmission subsystem 103, which monitors and manages transmission files 105, which are resident on the mobile device. Transmission files 105 may be created by the various other subsystems in monitoring system 10. Operation of data transmission subsystem 103 begins at step 500 and proceeds to decision step 501. If a transmission file 105 is available at step 501, data transmission subsystem 103 then checks for the presence of a datalink or internet access at step 502. If a datalink or internet access is confirmed, data transmission subsystem 103 then checks for the availability of central control system 106 at step 503. If the availability of central control system 106 is confirmed, data transmission subsystem 103 will transmit local transmission files 105 to central control system 106 at step 504 and then receive a transmission report 505 from central control system 106 at step 505. If the transmission report confirms the data transmission was successful at step 506, data transmission subsystem 103 will then delete local transmission file 105 at step 507 to free up local resources (i.e., memory). Data transmission subsystem 103 may utilize various data transmission technologies such as, for example, wired and wireless connections, internet, Wi-Fi, Bluetooth, and infrared. In some embodiments, data transmission occurs in real-time and in other embodiments, transmission files 105 are stored in the mobile device for a period of time prior to transmission.

With reference again to FIG. 1, central control system 106 is operative to compare collected, calculated and/or derived data to known or predetermined parameters or conditions such as, for example, population density for a geographic location; crime rates for a geographic location; number of accidents, and elevation above sea level for a geographic location. Central control system 106 may then compare detected geographic locations and time of day to the presence of an accident; road construction; full or partial road closures; snowfall; rainfall; and fog, among others. Central control system 106 may also compare operator behavior to known geographic location having certain characteristics.

One or more algorithms within central control system 106 are operative to assign ratings with regard to high, medium, or low risk (alternate rating schemes are possible such as a scaled rating from 0-100) to both operator behavior and vehicle behavior and then report these ratings to the operator on a periodic basis. An example of this rating process involves an operator operating a motor vehicle at a posted speed limit that may be classified as low risk when no road construction is present at the geographic location and classified as higher risk when road construction is present at the same geographic location. Another example of this rating process includes an operator operating a motor vehicle at posted speed limit that may be classified as low risk when there is no snowfall at geographic location and classified as higher risk when there is snowfall in excess of selected amount at the same geographic location. Other risk classification examples include: (i) a geographic location may be classified among low risk, medium risk and high risk based on the number of traffic accidents in the area; (ii) the same geographic location may be classified as lower risk during summer months and as higher risk during winter months based on the amount of precipitation; and (iii) a geographic location may be classified among low risk, medium risk or high risk based on the type of terrain, e.g., long straight roads, meandering mountain roads, etc. Classifications, particularly with regard to vehicle fleet management, may also be based on variables such as (i) the distance/time from a predetermined location; (ii) available capacity (e.g. ability to pick up passengers or goods to be transported; (iii) the type of goods that may be transported (e.g. liquids, dry, refrigerated, medical); and the amount of driving time and non-driving time recorded. Risk classifications may also be derived from data collected from other operators in a common geographic area. For example, the average speed of all operators using system 10 could be determined for a defined area at a certain time and a relative risk classification could be assigned to any operator deviating from the average speed. Operator driving history and/or a history of previous traffic incidents including accidents and traffic violations may also be used to determine or assign risk categories or classifications.

Figure 7A:
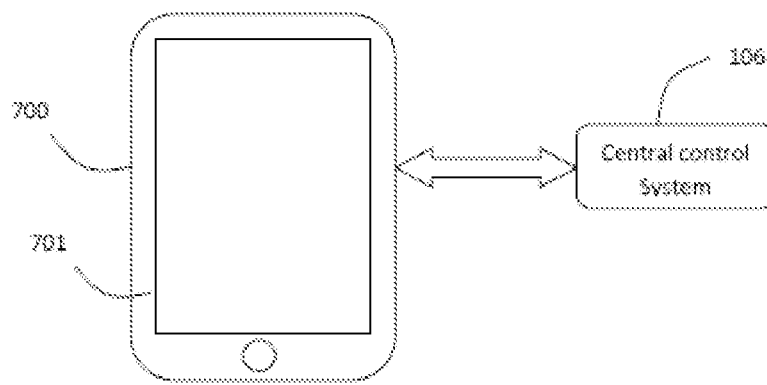
FIG. 7A depicts an embodiment of the present invention wherein the user interface includes a handheld device such as a mobile telephone.
Figure 7B:
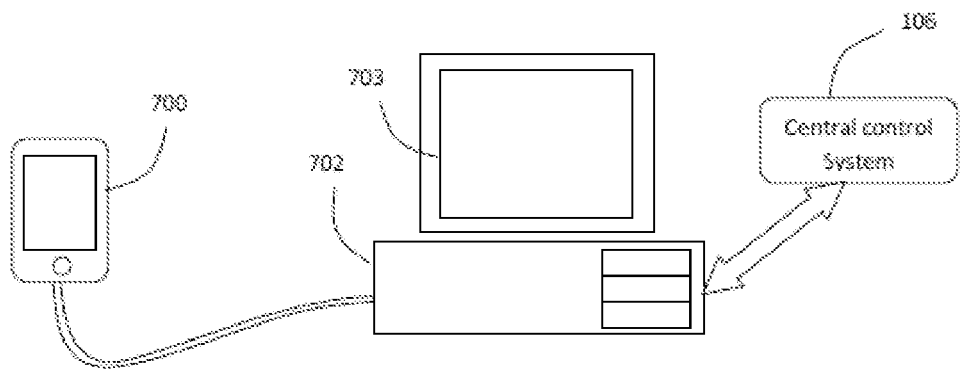
FIG. 7B depicts an embodiment of the present invention wherein the user interface includes a handheld device such as a mobile telephone and a computer.
Figure 7C:
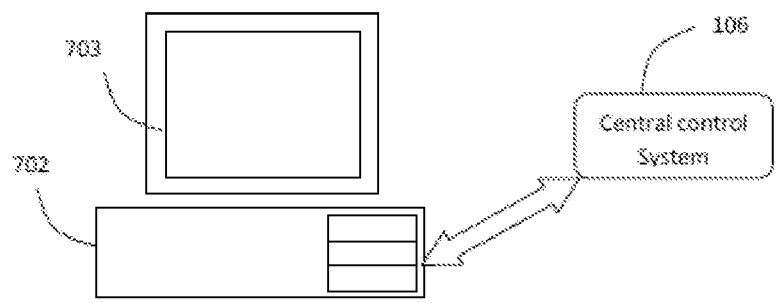
FIG. 7C depicts an embodiment of the present invention wherein the user interface includes a computer.

FIG. 7A depicts an embodiment of the present invention wherein the user interface with central control system 106 includes a handheld device such as mobile telephone 700 having a visual display 701. FIG. 7B depicts an embodiment of the present invention wherein the user interface with central control system 106 includes a handheld device such as mobile telephone 700, which is in communication with computer 702 having a visual display 703. FIG. 7C depicts an embodiment of the present invention wherein the user interface with central control system 106 includes computer 702 having a visual display 703. Each of these embodiments may be used for the initial setup of monitoring system 10, viewing trip summaries and/or performance reports, upgrading software, and sending information to and receiving information from central control system 106, among other purposes.

Figure 9:
FIG. 9 is a first example of a trip summary report in accordance with the vehicle and operator monitoring system of the present invention.
Figure 10:
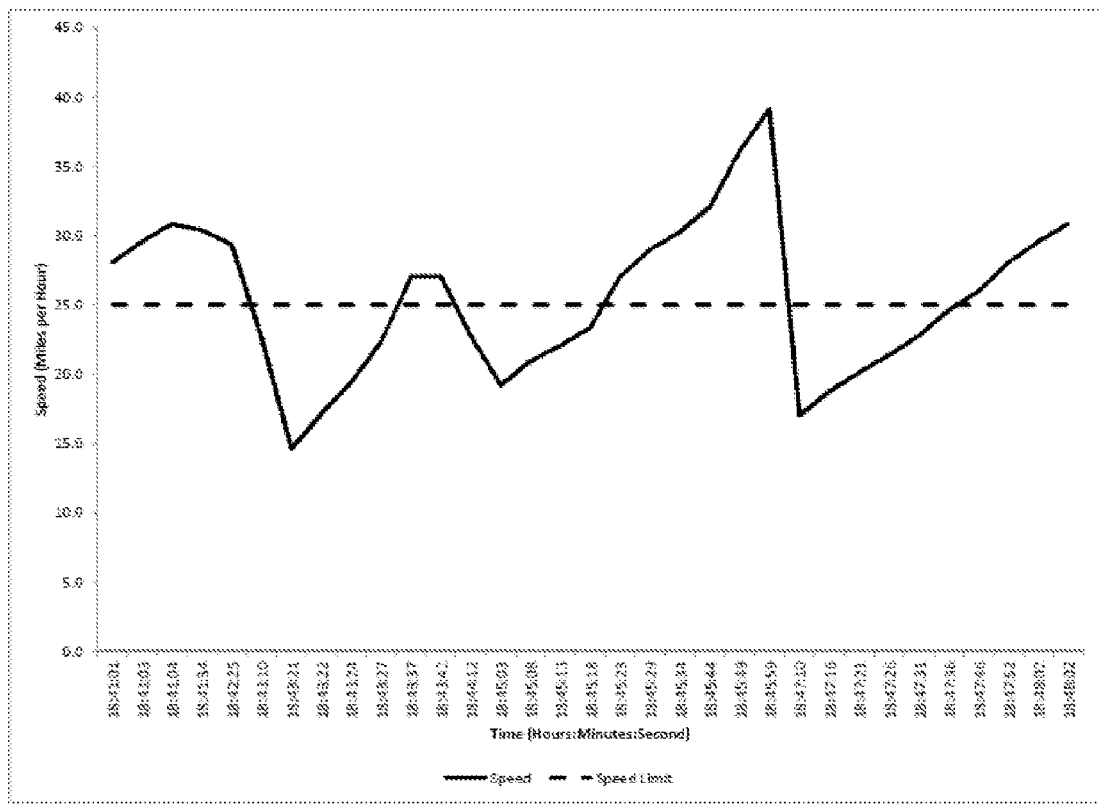
FIG. 10 is a second example of a trip summary report in accordance with the vehicle and operator monitoring system of the present invention.
Figure 11A:
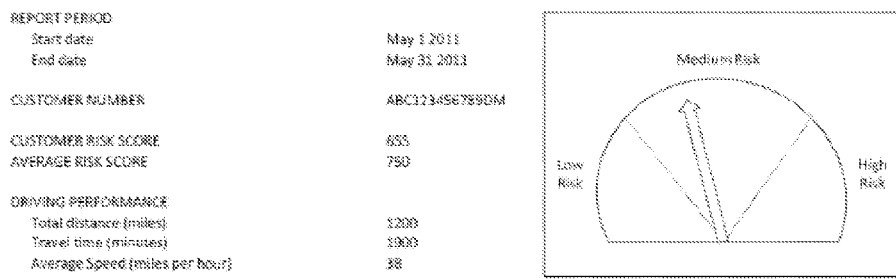
FIG. 11A is a first example of a usage summary report in accordance with the vehicle and operator monitoring system of the present invention.
Figure 11B:
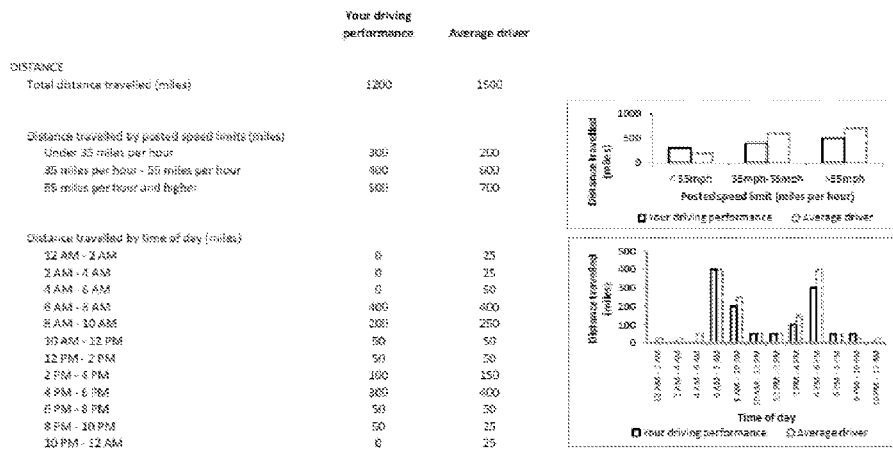
FIG. 11B is a second example of a usage summary report in accordance with the vehicle and operator monitoring system of the present invention.
Figure 11C:
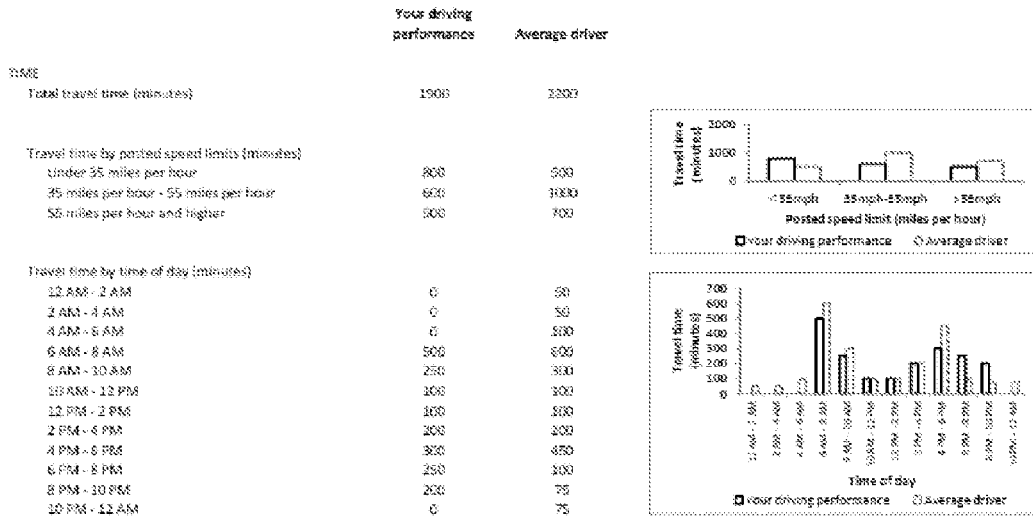
FIG. 11C is a third example of a usage summary report in accordance with the vehicle and operator monitoring system of the present invention.
Figure 11D:
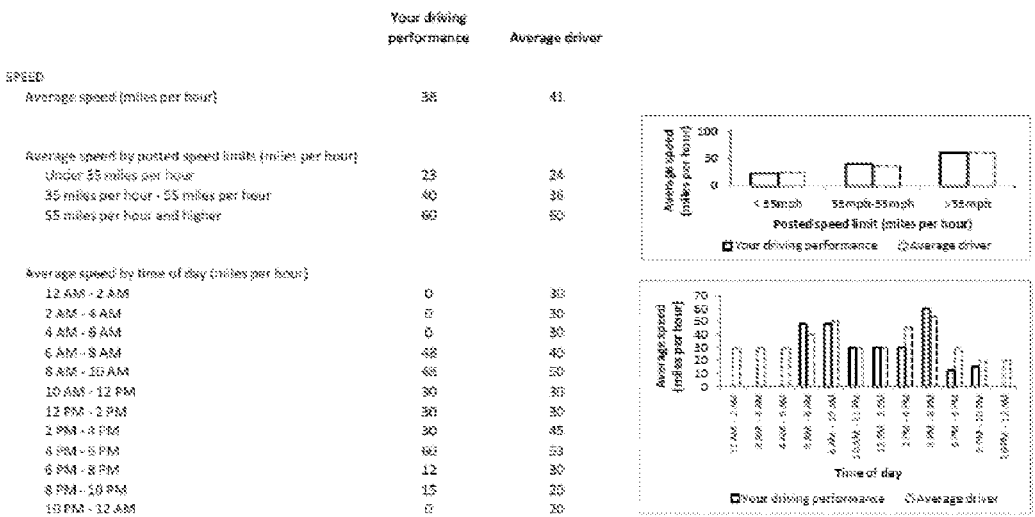
FIG. 11D is a fourth example of a usage summary report in accordance with the vehicle and operator monitoring system of the present invention.

FIG. 8 depicts a sample data transmission file that includes a plurality of records, each containing some or all of the data recorded and/or derived from the data recorded by data collection sub system 102 including date, time, vehicle speed, speed limit, zip code, direction, use of mobile phone, latitude, and longitude. FIG. 9 is a first example of a trip summary report recorded by data collection subsystem 102 showing a starting point for a trip, the route followed, and the ending point of the trip on a map. FIG. 10 is a second example of a trip summary report recorded by data collection subsystem 102 showing the actual speed of the vehicle and the speed limit posted on the route followed. The graphical representation may also show periods of rapid acceleration, deceleration, or braking. The graphical representation may include date and time of the trip. FIGS. 11A-F provide various examples of usage reports comparing an individual operator's performance to other operators. These reports may include summaries of an individual operator's driving history, including miles driven, driving time, average speed, calculated risk scores, graphical representations of risk ratings, graphical representation of operating performance compared to other operators, use of cellular phone and geographies visited. The reports may include sub-classifications such as posted speed limit, time of day, type of geography, weather conditions, etc.

Figure 12:
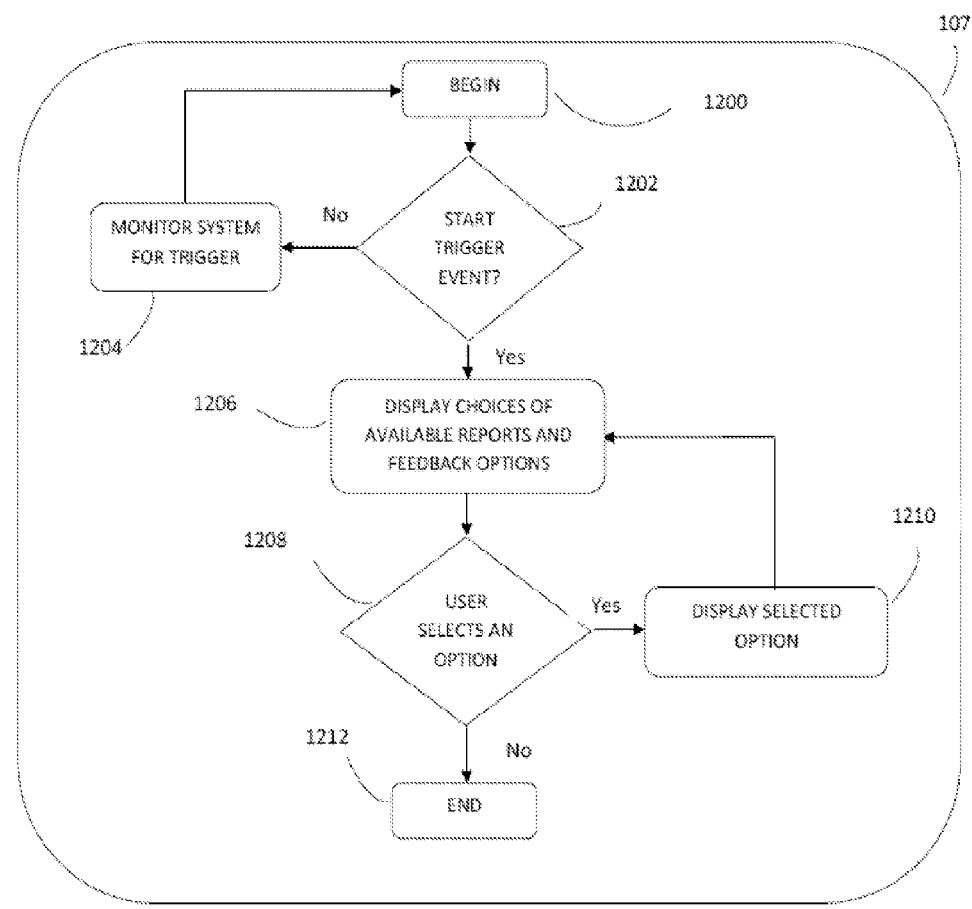
FIG. 12 is a flowchart illustrating the operation of the reporting and feedback subsystem of the present invention.

FIG. 12 is a flowchart illustrating the operation of the reporting and feedback subsystem 107. Operation of reporting and feedback subsystem 107 begins at step 1200 and proceeds to decision step 1202. If no "start" trigger event has occurred, reporting and feedback subsystem 107 continues to monitor system 10 for trigger events at step 1204. If a "start" trigger event has occurred at decision step 1202, reporting and feedback subsystem 107 displays choices of available reports and feedback options at step 1206. The user selects one or more options at decision step 1208, which results in the selected option being displayed at step 1210 or the process ending at step 1212.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A system for monitoring operator and motor vehicle behavior, comprising:
   (a) at least one mobile device,
      (i) wherein the mobile device is not installed in a vehicle being monitored and does not interface directly with the vehicle;
      (ii) wherein the mobile device further includes hardware, software, sensors, and communications functions; and
      (iii) wherein the hardware, software, sensors, and communications functions are operative to gather, record, characterize and communicate information about both the behavior of a motor vehicle and the behavior of an operator of the motor vehicle; and
   (b) application software resident on the mobile device,
      (i) wherein the application software interfaces with the hardware, software, sensors, and communications functions to gather, record, and characterize information relevant to both the behavior of a motor vehicle and the behavior of an operator of the motor vehicle; and
      (ii) wherein the application software is activated or deactivated based on certain predetermined trigger events; and
   (c) at least one information processor in communication with the mobile device or resident on the mobile device,
      (i) wherein the information processor further includes hardware; software; databases; communications functions; local memory; statistical programs and algorithms; demographic, geographic, driver, vehicle, and weather information; or combinations thereof;
      (ii) wherein the information processor is operative to communicate with the application software; collect, process, add to, and further characterize the information gathered by the application software; and
      (iii) wherein the information processor is further operative to communicate the processed and further characterized information to a user of the system.

2. The system of claim 1, wherein the at least one mobile device is a smartphone.

3. The system of claim 1, wherein the information about both the behavior of a motor vehicle and the behavior of an operator of the motor vehicle further includes vehicle location, vehicle speed, vehicle direction, external environmental conditions including weather, traffic conditions, time, mobile device usage as a telephone, mobile device usage for internet access, operator driving history, previous operator violations, combinations thereof, and other information derived from these variables.

4. The system of claim 1, wherein the application software resident on the mobile device further includes a set-up subsystem; an administrative subsystem; a data collection subsystem; a data transmission subsystem; a local database; at least one data transmission file; a reporting and feedback subsystem; or combinations thereof; and
   (a) wherein the set-up subsystem is operative to allow a user of the system to initiate and configure operation of the application software;
   (b) wherein the administrative subsystem is operative to monitor the system and use the predetermined trigger events to control and modify the operation of the system;
   (c) wherein the data collection subsystem is operative to gather, record, calculate and derive information from the other subsystems;
   (d) wherein the data transmission subsystem is operative to communicate with the user of the system;
   (e) wherein the local database is operative to store information gathered, calculated, and derived by other subsystems;
   (f) wherein the at least one data transmission file is used to communicate with the user of the system; and
   (g) wherein the reporting and feedback subsystem is operative to provide usage reports and feedback to the user of the system and wherein the reports and feedback further include at least one of information collected, recorded, characterized, derived, compared to at least one other user of the system and aggregated over time by the information processor; and wherein the reports and feedback formats include numerical, graphical, tabular, pictorial, or combinations thereof.

5. The system of claim 1, wherein the at least one information processor is a computer.

6. The system of claim 1, wherein the at least one information processor is further operative to classify or provide ratings with regard to both vehicle and operator behavior; and
   (a) wherein classifying or providing ratings to vehicle behavior further includes vehicle distance from pre-determined locations; available capacity; types of goods and passengers transported; operation under specific vehicle operator characteristic; behavior relative to other vehicles; behavior over time operation under specific geographically-defined characteristics; or combinations thereof; and
      (i) wherein the specific geographically-defined characteristics further include speed limit, traffic accidents, presence of construction, amount of precipitation during a predetermined time period, terrain and road types, weather conditions during a predetermined time period, and seasons; geographical conditions impacting specific motor vehicle characteristics and geographical conditions impacting specific vehicle operator characteristics; and
   (b) wherein classifying or providing ratings to operator behavior includes determining total distance traveled; operation of a motor vehicle with specific vehicle characteristics; operation of a motor vehicle relative to speed limit, operation of a motor vehicle at predetermined time of day; rapid acceleration; rapid deceleration; usage of mobile device as a telephone; usage of mobile device for internet access; behavior relative to other vehicle operators; behavior over time operation of a motor vehicle within specific geographically-defined characteristics; or combinations thereof; and
      (i) wherein the specific geographically-defined characteristics further include speed limit, traffic accidents, presence of construction, amount of precipitation during a predetermined time period, terrain and road types, weather conditions during a predetermined time period, and seasons; geographical conditions impacting specific motor vehicle characteristics and geographical conditions impacting specific vehicle operator characteristics.

7. A system for monitoring operator and motor vehicle behavior, comprising:
   (a) at least one mobile device,
      (i) wherein the mobile device is located within a motor vehicle being operated by an operator of the vehicle;

(ii) wherein the mobile device is not installed in a vehicle being monitored and does not interface directly with the vehicle;

(iii) wherein the mobile device further includes hardware, software, sensors, and communications functions; and a) wherein the hardware, software, sensors, and communications functions are operative to record, characterize, and communicate information about both the behavior of a motor vehicle and the behavior of an operator of the motor vehicle; and b) wherein the hardware, software, sensors, and communications functions further include at least one information processor; local memory; a system clock; a compass; a camera; an accelerometer; location, Internet, and telephone communications; or combinations thereof; and (b) first application software resident on the mobile device, (i) wherein the first application software interfaces with the hardware, software, sensors, and communications functions; and (ii) wherein the first application software is operative to measure or determine information relevant to both the behavior of the motor vehicle and the behavior of the operator of the motor vehicle;

(c) second application software resident on the mobile device, (i) wherein the second application software is operative to gather and record information generated by the first application software; and (ii) wherein the second application software is activated or deactivated based on certain predetermined trigger events; and (d) at least one information processor in communication with the mobile device or resident on the mobile device, (i) wherein the information processor further includes hardware; software; databases; communications functions; local memory; statistical programs and algorithms; demographic, geographic, driver, vehicle, and weather information; or combinations thereof;

(ii) wherein the information processor is operative to communicate with the application software; collect, process, add to, and further characterize the information gathered by the application software; and (iii) wherein the information processor is further operative to communicate the processed and further characterized information to a user of the system.

8. The system of claim 7, wherein the at least one mobile device is a smartphone.

9. The system of claim 7, wherein the information about both the behavior of a motor vehicle and the behavior of an operator of the motor vehicle further includes vehicle location, vehicle speed, vehicle direction, external environmental conditions including weather, traffic conditions, time, mobile device usage as a telephone, mobile device usage for internet access, operator driving history, previous operator violations, combinations thereof, and other information derived from these variables.

10. The system of claim 7, wherein either the first or second application software resident on the mobile device further includes a set-up subsystem; an administrative subsystem; a data collection subsystem; a data transmission subsystem; a local database; at least one data transmission file; a reporting and feedback subsystem; or combinations thereof; and (a) wherein the set-up subsystem is operative to allow a user of the system to initiate and configure operation of the application software;

(b) wherein the administrative subsystem is operative to monitor the system and use the predetermined trigger events to control and modify the operation of the system;

(c) wherein the data collection subsystem is operative to gather, record, calculate and derive information from the other subsystems;

(d) wherein the data transmission subsystem is operative to communicate with the user of the system;

(e) wherein the local database is operative to store information gathered, calculated, and derived by other subsystems;

(f) wherein the at least one data transmission file is used to communicate with the user of the system; and (g) wherein the reporting and feedback subsystem is operative to provide usage reports and feedback to the user of the system and wherein the reports and feedback further include at least one of information collected, recorded, characterized, derived, compared to at least one other user of the system and aggregated over time by the information processor; and wherein the reports and feedback formats include numerical, graphical, tabular, pictorial, or combinations thereof.

11. The system of claim 7, wherein the at least one information processor is a computer.

12. The system of claim 7, wherein the at least one information processor is further operative to classify or provide ratings with regard to both vehicle and operator behavior; and (a) wherein classifying or providing ratings to vehicle behavior further includes vehicle distance from pre-determined locations; available capacity; types of goods and passengers transported; operation under specific vehicle operator characteristic; behavior relative to other vehicles; behavior over time operation under specific geographically-defined characteristics; or combinations thereof; and (i) wherein the specific geographically-defined characteristics further include speed limit, traffic accidents, presence of construction, amount of precipitation during a predetermined time period, terrain and road types, weather conditions during a predetermined time period, and seasons; geographical conditions impacting specific motor vehicle characteristics and geographical conditions impacting specific vehicle operator characteristics; and (b) wherein classifying or providing ratings to operator behavior includes determining total distance traveled; operation of a motor vehicle with specific vehicle characteristics; operation of a motor vehicle relative to speed limit, operation of a motor vehicle at predetermined time of day; rapid acceleration; rapid deceleration; usage of mobile device as a telephone; usage of mobile device for internet access; behavior relative to other vehicle operators; behavior over time operation of a motor vehicle within specific geographically-defined characteristics; or combinations thereof; and (i) wherein the specific geographically-defined characteristics further include speed limit, traffic accidents, presence of construction, amount of precipitation during a predetermined time period, terrain and road types, weather conditions during a predetermined time period, and seasons; geographical conditions impacting specific motor vehicle characteristics and geographical conditions impacting specific vehicle operator characteristics.

13. The system of claim 7, wherein a user of the system is the operator of the vehicle, insurance companies, commercial and fleet managers, law enforcement, departments of motor vehicles, emergency response providers, educators, or combinations thereof.

14. A system for monitoring operator and motor vehicle behavior, comprising:
(a) a motor vehicle;
(b) an operator, wherein the operator is operating the motor vehicle;
(c) at least one mobile device,
 (i) wherein the mobile device is located within a motor vehicle being operated by an operator of the vehicle;
 (ii) wherein the mobile device is not installed in a vehicle being monitored and does not interface directly with the vehicle;
 (iii) wherein the mobile device further includes hardware, software, sensors, and communications functions; and
 (iv) wherein the hardware, software, sensors, and communications functions are operative to gather, record, characterize and communicate information about both the behavior of a motor vehicle and the behavior of an operator of the motor vehicle; and
(d) first application software resident on the mobile device,
 (i) wherein the first application software interfaces with the hardware, software, sensors, and communications functions; and
 (ii) wherein the first application software is operative to measure or determine information relevant to both the behavior of the motor vehicle and the behavior of the operator of the motor vehicle; and
(e) second application software resident on the mobile device,
 (i) wherein the second application software is operative to gather and record information generated by the first application software;
 (ii) wherein the second application software is activated or deactivated based on certain predetermined trigger events; and
 (iii) wherein the predetermined trigger events further include date; time set-up complete; set-up incomplete; license agreed; end of license term; license renewed; presence of data in local database; size of database; file size; number of attempts; battery charge; change in location; speed; time; altitude; availability of information processor; transmission report from information processor; presence of datalink including wired connection; wireless connection; internet; Wi-Fi; Bluetooth and infrared; user preferences; force start; force stop; or combinations thereof; and
(f) at least one information processor in communication with the mobile device or resident on the mobile device,
 (i) wherein the information processor further includes hardware; software; databases; communications functions; local memory; statistical programs and algorithms; demographic, geographic, driver, vehicle, and weather information; or combinations thereof;
 (ii) wherein the information processor is operative to communicate with the application software; collect, process, add to, and further characterize the information gathered by the application software; and
 (iii) wherein the information processor is further operative to communicate the processed and further characterized information to a user of the system.

15. The system of claim 14, wherein the at least one mobile device is a smartphone.

16. The system of claim 14, wherein the information about both the behavior of a motor vehicle and the behavior of an operator of the motor vehicle further includes vehicle location, vehicle speed, vehicle direction, external environmental conditions including weather, traffic conditions, time, mobile device usage as a telephone, mobile device usage for internet access, operator driving history, previous operator violations, combinations thereof, and other information derived from these variables.

17. The system of claim 14, wherein either the first or second application software resident on the mobile device further includes a set-up subsystem; an administrative subsystem; a data collection subsystem; a data transmission subsystem; a local database; at least one data transmission file; a reporting and feedback subsystem; or combinations thereof; and
(a) wherein the set-up subsystem is operative to allow a user of the system to initiate and configure operation of the application software;
(b) wherein the administrative subsystem is operative to monitor the system and use the predetermined trigger events to control and modify the operation of the system;
(c) wherein the data collection subsystem is operative to gather, record, calculate and derive information from the other subsystems;
(d) wherein the data transmission subsystem is operative to communicate with the user of the system;
(e) wherein the local database is operative to store information gathered, calculated, and derived by other subsystems;
(f) wherein the at least one data transmission file is used to communicate with the user of the system; and
(g) wherein the reporting and feedback subsystem is operative to provide usage reports and feedback to the user of the system and wherein the reports and feedback further include at least one of information collected, recorded, characterized, derived, compared to at least one other user of the system and aggregated over time by the information processor; and wherein the reports and feedback formats include numerical, graphical, tabular, pictorial, or combinations thereof.

18. The system of claim 14, wherein the at least one information processor is a computer.

19. The system of claim 14, wherein the at least one information processor is further operative to classify or provide ratings with regard to both vehicle and operator behavior; and
(a) wherein classifying or providing ratings to vehicle behavior further includes vehicle distance from pre-determined locations; available capacity; types of goods and passengers transported; operation under specific vehicle operator characteristic; behavior relative to other vehicles; behavior over time operation under specific geographically-defined characteristics; or combinations thereof; and
 (i) wherein the specific geographically-defined characteristics further include speed limit, traffic accidents, presence of construction, amount of precipitation during a predetermined time period, terrain and road types, weather conditions during a predetermined time period, and seasons; geographical conditions impacting specific motor vehicle characteristics and geographical conditions impacting specific vehicle operator characteristics; and
(b) wherein classifying or providing ratings to operator behavior includes determining total distance traveled; operation of a motor vehicle with specific vehicle characteristics; operation of a motor vehicle relative to speed limit, operation of a motor vehicle at predetermined time of day; rapid acceleration; rapid deceleration; usage of mobile device as a telephone; usage of mobile device for internet access; behavior relative to other vehicle operators; behavior over time; operation of a motor vehicle within specific geographically-defined characteristics; or combinations thereof; and (i) wherein the specific geographically-defined characteristics further include speed limit, traffic accidents, presence of construction, amount of precipitation during a predetermined time period, terrain and road types, weather conditions during a predetermined time period, and seasons; geographical conditions impacting specific motor vehicle characteristics and geographical conditions impacting specific vehicle operator characteristics.

20. The system of claim 14, wherein a user of the system is the operator of the vehicle, insurance companies, commercial and fleet managers, law enforcement, departments of motor vehicles, emergency response providers, educators, or combinations thereof.

* * * * *